United States Patent [19]
Trieb et al.

[11] Patent Number: 5,460,051
[45] Date of Patent: Oct. 24, 1995

[54] STRAIN RELIEF DEVICE FOR A LINE GUIDING ASSEMBLY

[76] Inventors: Karl-Heinz Trieb, Lindenstrasse 15, 91710 Gunzenhausen; Josef Steff, Hagenbuchring 19, 91802 Meinheim, both of Germany

[21] Appl. No.: 298,518

[22] Filed: Aug. 30, 1994

[30] Foreign Application Priority Data

Aug. 30, 1993 [DE] Germany .............. 9313011 U

[51] Int. Cl.⁶ ............................ G01N 3/08
[52] U.S. Cl. ............................ 73/828; 248/68.1
[58] Field of Search ............ 73/828, 829, 856, 73/248

[56] References Cited

U.S. PATENT DOCUMENTS

| | | | |
|---|---|---|---|
| 3,893,480 | 7/1975 | Dunbar | 137/615 |
| 5,184,794 | 2/1993 | Saito | |
| 5,230,420 | 7/1993 | Meier et al. | 198/750 |
| 5,332,865 | 7/1994 | Jensen | 174/99 |

FOREIGN PATENT DOCUMENTS

| | | |
|---|---|---|
| 0383276 | 2/1990 | European Pat. Off. |
| 0490022 | 4/1991 | European Pat. Off. |
| 4015803 | 4/1990 | Germany |

*Primary Examiner*—Richard Chilcot
*Assistant Examiner*—Max H. Noori
*Attorney, Agent, or Firm*—Victor M. Genco, Jr.

[57] ABSTRACT

A strain relief device is provided for a line guiding assembly with a line channel capable of holding at least one line to be guided within the channel wherein the strain relief device has a pressure fitted connection device which serves to connect an apparatus to be connected to a line.

15 Claims, 2 Drawing Sheets

STRAIN RELIEF DEVICE FOR A LINE GUIDING ASSEMBLY

FIELD OF THE INVENTION

A strain relief device is provided for a line guiding assembly, The line guiding assembly has a line channel. The strain relief device is capable of holding at least one line to be guided within the line channel. The strain relief device includes a pressure fitted connection device which serves to connect an apparatus to be connected with one or more line(s), and/or with another pressure fitted connection device which serves to connect one or more line(s) with the first connection device.

BACKGROUND OF THE INVENTION

European Patent Application EP 0490022 A2 describes a line guiding assembly having sliding grooves which serve as a substitute for a conventional cable dragchain. The sliding grooves allow for a sliding motion of an upper length of a flat ribbon cable upon a lower length of a flat ribbon cable when a movable apparatus is moved relative to a stationary apparatus connected therewith via the flat ribbon cable.

In a conventional line guiding assembly, a strain relief device typically has a first connection device consisting of a holding plate which is connected to an apparatus to be connected through a spacer, and a second connection device consisting of a cable terminal which damps and accommodates a flat ribbon cable. The second connection device is itself connected with the holding plate. Since the flat ribbon cable is arranged in sliding grooves, the sliding grooves also act as a strain relief for the flat ribbon cable in the area of the sliding grooves. In this regard, there are various strain relief solutions for flat ribbon cables which am securely connected with a line channel of a line guiding assembly by way of sliding grooves.

There is a need, however, for a strain relief device for a line guiding assembly which ensures both an efficient strain relief for a line channel and an efficient strain relief for loose lines within the line channel, independent of the design of the line channel.

SUMMARY OF THE INVENTION

A strain relief device is provided for a line guiding assembly. The line guiding assembly is defined by a line channel which is capable of holding at least one line within the line channel. The strain relief device comprises a first fitted connection device, and a form fitting insert. The first fitted connection device connects a line channel to an apparatus to be connected with lines. The form fitting insert is soft and elastic is defined by a non-slippery surface, and fills radial interstices between the at least one line and the first connection device. The material insert may be comprised of microcellular rubber.

In another embodiment of the present invention, a strain relief device is provided that includes a U-shaped first connection device having a base part and two lateral parts. In this embodiment, the base part serves as a connection with an apparatus to be connected with lines. The lateral parts serve as a connection with a line channel. The lateral parts may be separate parts connectable with the base part and one end of a line channel by way of coupling elements, such as first and second coupling devices, respectively. The strain relief device may further be provided with pegs which are secured by a screw mechanism between the lateral parts and the base part to form the first coupling device. The pegs also may be provided between the lateral parts and the line channel to form the second coupling device.

The lateral parts may accommodate the line channel end in a line channel accommodation area, and may accommodate the material insert in a material insert accommodation area. The lateral parts may be connected with each other in the material insert accommodation area through a cover part. An engagement connection may be further provided to connect the cover part with the lateral parts.

The material insert may consist of a material block which is provided with a slot in an intermediate level to accommodate at least one line between adjacent contact areas. The material insert may also consist of at least two material blocks to accommodate at least one line between adjacent contact surfaces. The contact area may further be provided with a recess which is adapted to the diameter of a line.

The strain relief device may also be provided with coupling elements, wherein both sides of at least one lateral part am provided with such coupling elements for lateral connection of another base part, another line channel and another cover part. Accordingly, several line guiding assemblies can be arranged in a fashion to form a strain relief device comprising several strain relief units.

DETAILED DESCRIPTION OF THE INVENTION

Figure 1:
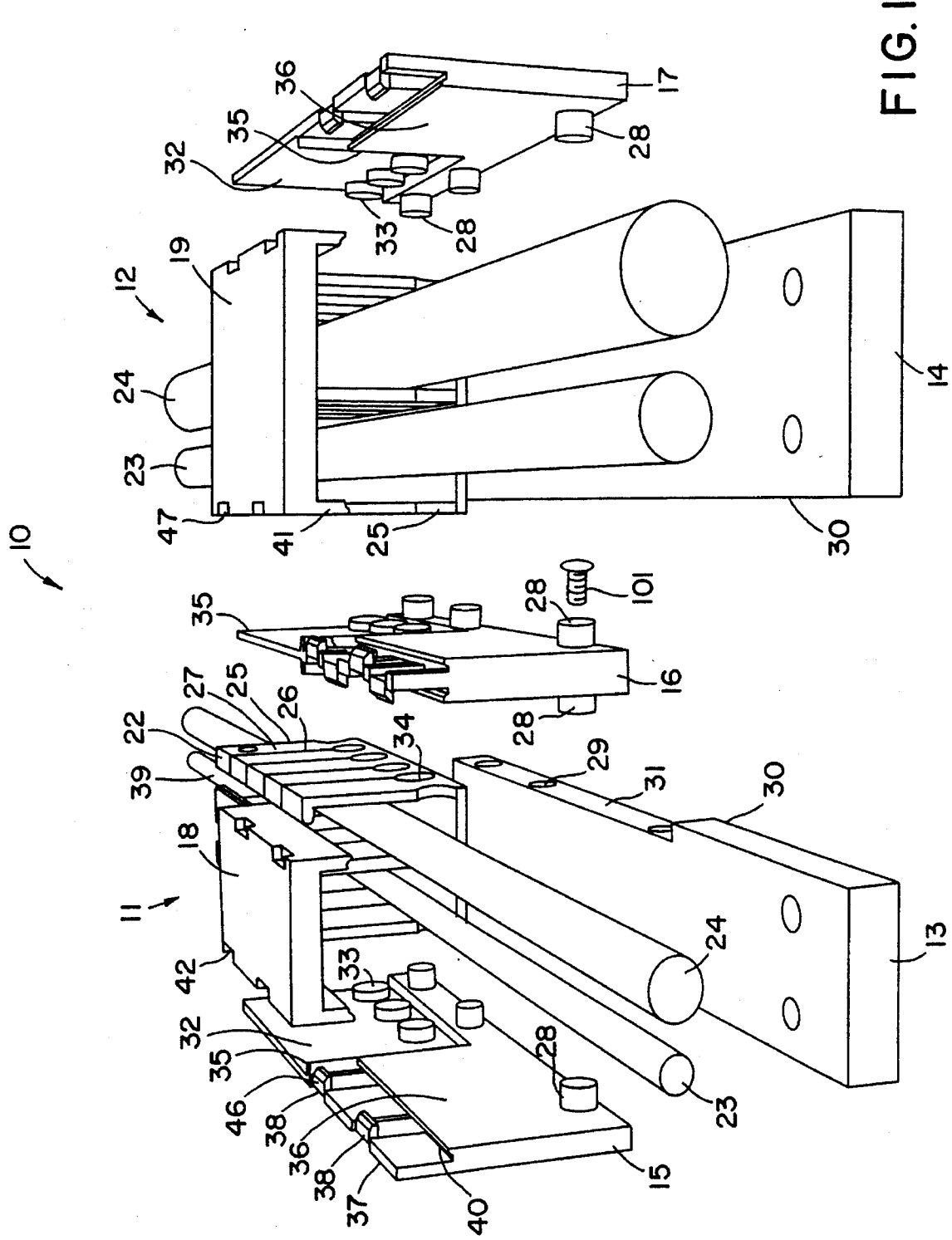
FIG. 1 is an exploded view of a strain relief device comprising two strain relief device units.

A strain relief device Is provided for a line guiding assembly, The line guiding assembly is defined by a line channel which is capable of holding at least one line within the line channel. The strain relief device comprises a first fitted connection device, and a form fitting insert. The first fitted connection device connects a line channel to an apparatus to be connected with lines. The form fitting insert is soft and elastic, is defined by a non-slippery surface, and fills radial interstices between the at least one line and the first connection device. The material insert may be comprised of microcellular rubber.

The soft and elastic material insert with its non-slippery surface allows for a pressure fitted strain-relieving accommodation of individual lines without necessitating a special adaptation to the cross-sections of the cables. Even cables which differ in diameter can be accommodated in a pressure fitted way due to the soft and elastic material insert which adapts to the cross-sections of the individual cables. Furthermore, the material insert ensures that the cables are relieved of strain independent of the construction of the line channel. The inventive strain relief device is suitable for use with sliding grooves. This type of channel may consist of a material which allows for gliding and may incorporate individual segments separated by bending indentations which serves as a dragchain substitute. Alternatively, the inventive strain relief device is suitable for use with a conventional dragchain without impairing the effect of the additional connection device acting as a strain relief for the cables independently of the line channel. The arrangement of the material insert in the radial interstice between the line(s) and the first connection device creates an expansion limit for the material insert so that pressure required for the strain-relieving accommodation of the lines can be built up.

In the material insert of the strain relief, the frictional force required for the strain-relieving accommodation is achieved by pressing the surface of the material insert against the line circumference as well as by a non-slippery structure of the material insert surface, which creates a high frictional coefficient. Such a material insert can be achieved in a particularly advantageous way by using microcellular rubber, which has both above-mentioned properties.

In a particularly preferred embodiment of the strain relief device, the first connection device is provided with a base part with two lateral pieces which supplement the base part in its cross-section, basically in a U-shape.

The base part of the first connection device serves as a connection with an apparatus to be connected. The lateral pieces of the connection device serve as a connection with the line channel of a line guiding assembly. Such a design of the first connection device allows for a particularly simple integration of the line channel into the strain relief device.

The lateral pieces are preferably designed as separate parts and have coupling elements of a first coupling device for connection to the base part and coupling elements of a second coupling device for connection to the line channel. This advantageous design makes the strain relief device particularly easy to install, in that first the base part can be connected with the apparatus and then the line channel can be connected with the base part via the lateral pieces to connect the line channel to the apparatus.

This assembly is further facilitated when the first coupling device is designed in a pressure fitted and in a form fitted way and the second coupling device is only of a form fitted design.

Preferably pegs, secured by a screw device, are used for the first coupling device. In contrast to that, a second coupling device may be provided only with pegs between the lateral piece and the line channel.

The lateral pieces may be designed such that they accommodate between each other the line channel end in a line channel accommodation area and the material insert in a material insert area. This advantageous embodiment of the strain relief device facilitates the assembly because the installation of the lateral parts on the base part allows both the connection with the material insert and the connection with the line channel to be effected in a single step.

A cover part may be provided to limit the extension of the material insert and to connect the lateral pieces in their edge areas located opposite of the base part. Since the extension limits for the material insert are created only after their installation between the lateral pieces, the mounting of the material insert between the lateral pieces is considerably facilitated.

If an engagement connection is provided to connect the cover with the lateral pieces, the connection of the cover part with the lateral pieces may be simply effected by pressing the cover part onto the material insert until the connection is engaged, and it is not necessary, as would be the case with a screw-type connection, to hold the cover part in the connection position against the elastic resistance of the material insert until the connection has been completed.

The material insert may consist of one material block which is provided with a slot to take up lines between adjacent contact areas in an intermediate level. Thus a one-piece material insert may be formed in a particularly simple way.

Furthermore, it is possible to design the material insert with at least two material blocks which are capable of taking up lines between adjacent contact areas. The advantage of this material insert construction is that the material insert is simply formed from cut-to-size pieces of a continuous material and that no further processing steps are required.

In case of a particularly large line diameter which entails that the material insert reaches its elastic limits and can no longer fit snugly around the entire line circumference, a material insert may be provided with a recess adapted to the diameter of the line. In any case, however, it is a special basic advantage of the above-mentioned material insert that it can be achieved without special adaptations and is suitable for the simultaneous, pressure fitted accommodation of several lines of different diameters.

The strain relief device is also particularly suitable for use in a modular construction comprising several strain relief units provided that at least one lateral piece is provided with coupling elements on both sides to laterally connect another base part, another line channel and another cover part, in such a way that several line guiding assemblies can be arranged in parallel to each other on a common level.

It is thus possible to supplement the strain relief device, if required, in order to create strain relief facilities for any desired number of line channels with lines located therein.

The invention is best understood by reference to the accompanying drawings.

FIG. 1 shows a strain relief device 10 consisting of two strain relief units 11, 12, shown as separate parts. The strain relief units 11, 12 each comprise a base part 13, 14, two lateral parts 15, 16 and 16, 17 respectively, a cover part 18, 19 and a material insert 20 best seen in FIG. 2.

For a strain relief device 10 consisting of two strain relief units 11, 12 the lateral piece 16 is designed in a bilaterally effective way so that the lateral piece 16 serves both the strain relief unit 11 as well as the strain relief unit 12.

Each strain relief unit 11, 12 serves as a pressure-fitted, strain-relieving accommodation for a line guiding assembly 51 (FIG. 2) with a line channel 22 and two lines 23, 24 which are loosely guided in the line channel 22. The lines 23, 24 may be electrical cables or any other flexible lines which serve to connect a stationary apparatus with a movable apparatus.

Here, line channels 22 are designed in the form of a dragchain substitute. FIG. 1 shows the ends 25 of the line channels 22 which consist of individual segments 27 which are separated from each other by bending indentations 26. The segments 27 have a basically rectangular profile section with a slot 39 which serves as an inlet for the lines 23, 24 from above into the line channel 22.

The lateral parts 15, 16, 17 are equipped with pegs 28 which are located in the lower edge areas of the lateral parts facing the base parts 13, 14 and which can be inserted into peg holes 29 in the lateral areas 30 of the base parts 13, 14. Both sides of the lateral piece 16 are equipped with pegs 28. In order to assure a gap-free connection of the two base parts 13, 14 in the area of the lateral part 16, the lateral area 30 of the base part 13 is equipped with a surface recess 31 corresponding to the thickness of the lateral part 16.

The pegs 28 may be provided with a through bore hole to secure the form fitted peg in the base parts 13, 14 and to allow a screw 101 to be screwed into the base part 13 or 14 through the pegs 28.

The lateral parts 15, 16, 17 may be further provided with a line channel accommodation area 32 with pegs 33 which serve as a form fitted connection with the line channel ends 25 which are equipped with corresponding peg holes 34. In addition, the embodiment shown in FIG. 1 has a surface recess 35 in the line channel accommodation area 32 of the lateral parts 15, 16, 17 which is designed such that the line channel end 25 flushes with the level of the surface of the lateral part when the lateral parts 15, 16, or 16, 17 are mounted to the base part 13, 14. Both sides of the lateral part 16 are equipped with the pegs 33 and the surface recess 35.

In a material insert area 36 which is arranged before the line channel accommodation area 32 in the view as shown in FIG. 1, the upper edge area includes an engagement connection zone 37 with engagement tongues 38. The engagement connection zone 37 is provided with a surface recess 40 which serves as a defined stop for the cover part 18 to be inserted from above between the lateral parts 15, 16, and 16, 17, respectively. The cover parts 18 are provided with stop bars 41 to effect the stop at the surface recess 40 of the lateral parts 15, 16 and 16, 17, respectively. Both sides of the lateral part 16 are equipped with the engagement connection zone 37.

Figure 2:
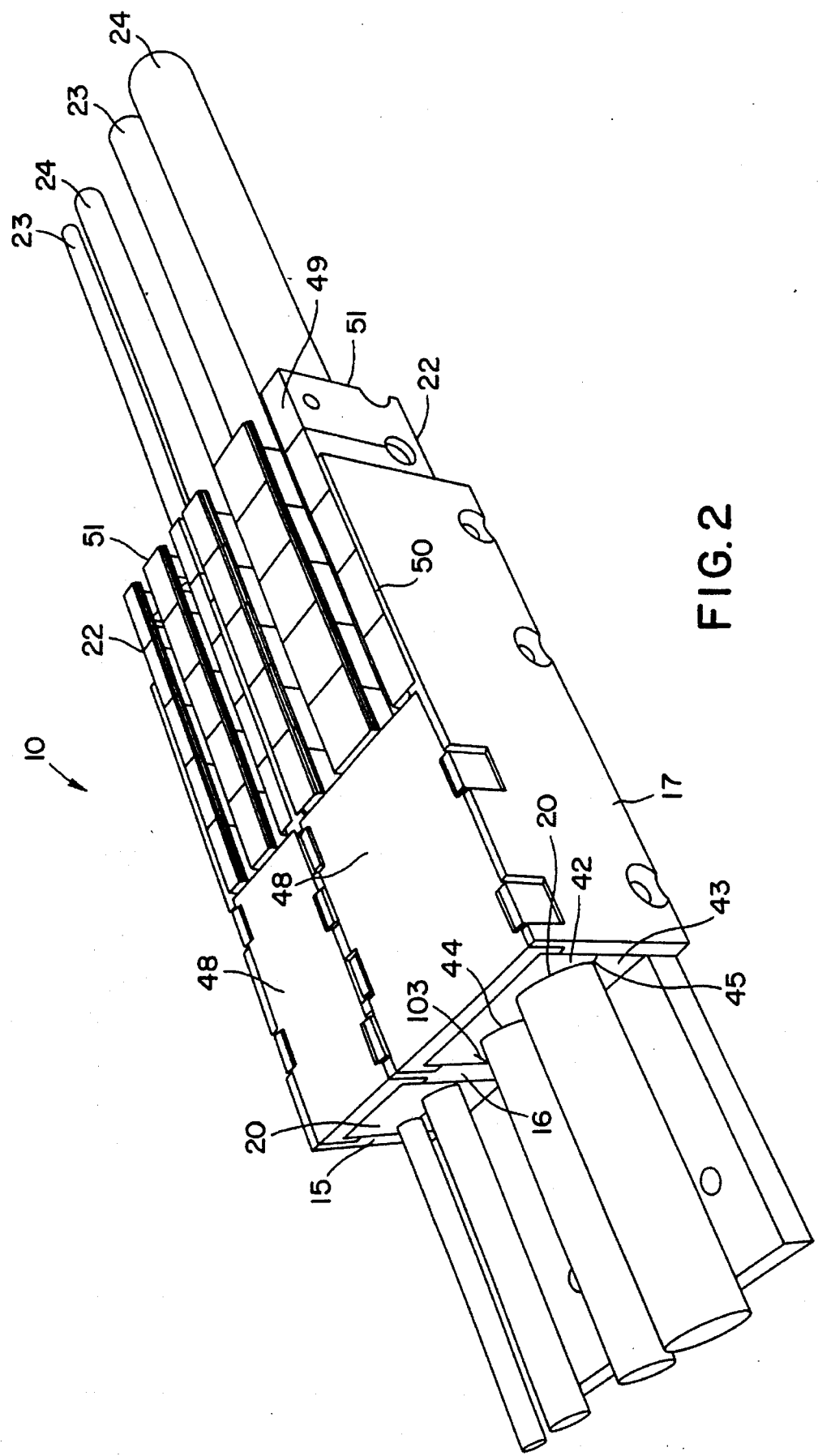
FIG. 2 is a figure of one of the strain relief devices in its assembled state and in a perspective view.

The cover parts 18 are mounted after the integration of the material insert 20 within the material insert accommodation areas 36 of the lateral parts 15, 16 and 16, 17, respectively. The material inserts 20 shown in FIG. 2 each comprise two material blocks 42, 43. The material blocks 42, 43, when not deformed, have a cuboid shape and their longitudinal dimensions basically correspond to the length of the cover part 18. The wave-like shape of the contact surfaces 44, 45 of the material blocks 42, 43 enclosing the circumference of the lines 23, 24 as shown in FIG. 2 is attributable to their elastic deformation when the cover part 18 is inserted between the lateral parts 15, 16, and 16, 17, respectively. A slot 103 may be provided in a material block at an intermediate level to accommodate at least one line between adjacent contact areas.

The cover parts 18 are inserted until they are stopped by the stop bars 41 at the corresponding surface ledges 40 of the lateral parts 15, 16 and 16, 17, respectively. While this happens, the engagement tongues 38 engage into appropriately shaped engagement recesses 47 on the longitudinal edges of the cover parts 18 with their engagement heads 46.

The perspective view of the strain relief device 10 in FIG. 2 makes clear that the cover parts 18 with their cover surfaces 48, the line channel ends 25 shown in FIG. 1 with their sliding surfaces 49 and the lateral parts 15, 16 and 17 with their upper edges 50 are arranged in a common level. This ensures that an upper length of the dragchain substitute can also slide on the sliding surfaces 49 of the line channel ends 25 and further beyond these on the cover surfaces 48 of the cover parts 18 without being obstructed by projecting upper edges 50 of the lateral pieces 15, 16, 17. Further, by selecting a suitable material for the cover parts 18, it is thus possible to utilize the surface of the strain relief device 10 as an extension of the sliding area.

We claim:

1. A strain relief device for a line guiding assembly, the line guiding assembly having a line channel capable of holding at least one line guided in the line channel, the strain relief device comprising: a first pressure fitted connection unit for connection of the line channel to an apparatus which is to be connected to the at least one line; and a second form fitted connection unit for connecting the at least one line to the first connection unit characterized in that the second connection unit is formed by a material insert which is soft and elastic, and fills a radial interstice between the at least one line and the first connection unit, and wherein the first pressure fitted connection unit and the second form fitted connection unit serve as a strain relief for the line channel and for the at least one line, independent of the design of the at least one line.

2. A strain relief device of claim 1, wherein the material insert consists of microcellular rubber.

3. A strain relief device of claim 1, wherein the first connection unit is provided with a base part with two lateral parts which supplement the base part in a U-shaped cross-section, wherein the base part serves as a connection with the apparatus and the lateral parts serve as a connection with the line channel.

4. A strain relief device of claim 3, wherein the lateral parts are separate parts which can be connected with the base part through coupling elements of a first coupling device and with one end of the line channel through coupling elements of a second coupling device.

5. A strain relief device of claim 4, wherein the first coupling device is pressure fitted and form fitted and the second coupling device is form fitted.

6. A strain relief device of claim 5, wherein the lateral parts and the base part are connected by pegs to form the first coupling device.

7. A strain relief device of claim 5, wherein the lateral parts and the line channel end are connected by pegs to form the second coupling device.

8. A strain relief device of claim 1, wherein the lateral parts accommodate between each other the line channel end in a line channel accommodation area and the material insert in a material insert accommodation area.

9. A strain relief device of claim 8, wherein the lateral parts are connected with each other in the material insert accommodation area in edge areas located opposite of the base part through a cover part.

10. A strain relief device of claim 9, wherein an engagement connection is provided to connect the cover part with the lateral parts.

11. A strain relief device of claim 1, wherein the material insert consists of a material block which is provided with a slot in an intermediate level to accommodate at least one line between adjacent contact areas.

12. A strain relief device of claim 1, wherein the material insert consists of at least two material blocks to accommodate at least one line between adjacent contact surfaces.

13. A strain relief device of claim 11, wherein at least one contact area is provided with a recess which is adapted to the diameter of a line.

14. A strain relief assembly comprising a plurality of line guiding assemblies and a plurality of strain relief units, the line guiding assemblies each having a line channel capable of holding at least one line guided in the line channel, wherein each strain relief unit further comprises a first pressure fitted connection unit for connection of the line Channel to an apparatus which is to be connected to the at least one line, and a second form fitted connection unit for connecting the at least one line to the first connection unit, the second form fitted connection unit formed by a material insert which is so elastic and which fills a radial interstice between any lines and the first connection unit, wherein the first connection unit comprises at least one lateral part, a cover part and a base part, and wherein both sides of the at least one lateral part are provided with coupling elements for lateral connection to another base part of another strain relief unit, and wherein the first pressure fitted connection and the second form fitted connection unit, of each strain relief unit, serve as a strain relief for the line channel and for the at least one guide.

15. A strain relief device of claim 12, wherein at least one contact area is provided with a recess which is adapted to the diameter of a line.

* * * * *